United States Patent
Papadopoulos (10) Patent No.: US 8,625,631 B2
(45) Date of Patent: Jan. 7, 2014

(54) METHOD AND APPARATUS FOR PILOT-REUSE IN RECIPROCITY-BASED TRAINING SCHEMES FOR DOWNLINK MULTI-USER MIMO

(75) Inventor: Haralabos Papadopoulos, San Jose, CA (US)

(73) Assignee: NTT Docomo, Inc., Tokyo (JP)

( * ) Notice: Subject to any disclaimer, the term of this patent is extended or adjusted under 35 U.S.C. 154(b) by 302 days.

(21) Appl. No.: 13/081,373

(22) Filed: Apr. 6, 2011

(65) Prior Publication Data
US 2011/0249597 A1 Oct. 13, 2011

Related U.S. Application Data (60) Provisional application No. 61/322,109, filed on Apr. 8, 2010.

(51) Int. Cl.
H04J 3/16 (2006.01)
H04W 40/00 (2009.01)

(52) U.S. Cl.
USPC .......................................... 370/468; 455/446

(58) Field of Classification Search
CPC ....................................................... H04J 3/1682
USPC .......... 370/329, 468, 203, 208, 209, 210, 330, 370/335, 431, 434, 437; 375/260, 267, 144, 375/347, 299, 148, 348, 349; 455/422.1, 455/434, 447, 449, 524, 525
See application file for complete search history.

(56) References Cited

U.S. PATENT DOCUMENTS

| | | | | |
|---|---|---|---|---|
| 8,165,159 | B2 * | 4/2012 | Oketani et al. ................ | 370/468 |
| 8,325,697 | B2 * | 12/2012 | Wu et al. ....................... | 370/341 |
| 2009/0075686 | A1 * | 3/2009 | Gomadam et al. ............ | 455/500 |
| 2009/0175228 | A1 * | 7/2009 | Kimura et al. ................ | 370/329 |
| 2010/0061297 | A1 | 3/2010 | Wei et al. | |
| 2010/0075687 | A1 | 3/2010 | Chayat | |
| 2010/0142634 | A1 * | 6/2010 | Filippi et al. ................. | 375/260 |
| 2010/0238883 | A1 * | 9/2010 | Borran et al. ................. | 370/329 |
| 2012/0113953 | A1 * | 5/2012 | Papadopoulos et al. ...... | 370/330 |

FOREIGN PATENT DOCUMENTS

WO 2004039022 A2 5/2004

OTHER PUBLICATIONS

PCT International Preliminary Report on Patentability for related PCT Patent Application No. PCT/US2011/031596, Oct. 10, 2012, 9 pgs.
PCT International Search Report for corresponding PCT Patent Application No. PCT/US2011/031596, Jul. 27, 2011, 4 pgs.
PCT Written Opinion of the International Searching Authority for corresponding PCT Patent Application No. PCT/US2011/031596, Jul. 27, 2011, 12 pgs.

* cited by examiner

*Primary Examiner* — Hanh N Nguyen
(74) *Attorney, Agent, or Firm* — Blakely, Sokoloff, Taylor & Zafman LLP (57) ABSTRACT

A method and apparatus is disclosed herein for employing pilot-reuse for training in the downlink of a wireless communication network. In one embodiment, the method comprises coordinating assignment of pilot codes across base stations in the topology and coordinating assignment of codes across base station-user terminal pairs, including assigning, from a set of pilot codes, a subset of codes to each cell in the topology, and assigning codes in each subset of codes to user terminals in said each cell based on cell dependent criteria; receiving waveforms from user terminals transmitting their assigned pilots; obtaining channel estimate information for channels between base station antennas and user terminals to which the base station is transmitting, the channel estimates based on the received waveforms; and transmitting to user terminals based on the channel estimate information.

19 Claims, 4 Drawing Sheets

METHOD AND APPARATUS FOR PILOT-REUSE IN RECIPROCITY-BASED TRAINING SCHEMES FOR DOWNLINK MULTI-USER MIMO

PRIORITY

The present patent application claims priority to and incorporates by reference the corresponding provisional patent application Ser. No. 61/322,109, titled, "Method and Apparatus for the Joint Design and Operation of Pilot-Reuse Methods in Reciprocity-Based Training Schemes for Downlink Multi-User MIMO," filed on Apr. 8, 2010.

FIELD OF THE INVENTION

The present invention relates to the field of pilot sequences used by user-terminals (UTs) across multi-site wireless deployments to enable reciprocity-based training in the context of downlink (DL) multi-user MIMO (MU-MIMO) transmission; more particularly, the present invention relates to pilot reuse by coordinating assignment of pilot sequences across base stations in a topology, including assigning a subset of pilots to user terminals in cells based on cell dependent criteria.

BACKGROUND OF THE INVENTION

Downlink (DL) transmission methods rely on knowledge of the channel at the transmitting base station (BS), or, more precisely, the availability of estimates of the channels between the BS antennas and the UTs to which this BS is transmitting information. This channel state information is then used to "precode" the information intended for each of the UTs prior to transmission, in such a way, that each of the UTs is able to decode the signals of its own interest.

The necessary channel state information is obtained by transmitting pilots (i.e., known signature waveforms) over the wireless medium and estimating these channels based on the received waveforms. Then these estimates are used for generating the MU-MIMO precoder (i.e., the transmission method) and for transmitting data to the UTs. Since the channels change over time (and frequency), the process of training is repeated periodically across the network. In what are referred to as "pilot-on-pilot" schemes, the pilot transmission cycles are aligned in time across all BSs, while in pilot-on-data schemes the pilot transmission cycles of a given BS overlap with data transmissions from other BSs. The fraction of time (or time-frequency slots) allocated to a single training session dictates the number of channel uses allocated for pilot training to each BS. The dimensionality of this "pilot-training" signal space places a constraint on the number of possible orthogonal (or, linearly independent) pilots that can be signaled during each training phase. Given that the number of BS-UT channels that need to be obtained across the whole network is well beyond the channel uses allocated for training in each training cycle, or equivalently well beyond the number of allotted signal space dimensions for pilot training, pilots have to be reused across the network.

There are two classes of training methods used in DL MU-MIMO for obtaining channel estimates at the transmitting BS. The two classes are effectively distinguished by the parties that transmit the pilots. In FDD-based training schemes, to estimate the channels between the BS and each of the UTs, pilots are first transmitted by the BS. Each UT then collects measurements of the transmitted pilots and estimates its own channels. Then over a shared channel on another band, the UTs communicate (feed back) these estimates to the BS in their cell.

In a second class of training schemes, referred to herein as TDD-based training schemes, estimates of the channels from each UT to its transmitting BS are obtained directly at the BS, by transmitting pilots from each of the UTs. These schemes rely on the notion of "channel reciprocity," which states that the channel from a BS to a UT on a given band and at a given time instance is the same as, or more accurately, correlated to the channel from the UT to the BS on a possibly different band and at a possibly different time instance, provided the gaps in time-instances and frequency-bands of the two channels are sufficiently small, i.e., within the channel coherence time and bandwidth, respectively. These schemes rely on sending pilots in the uplink from a set of UTs, collecting measurements at the BS, estimating the BS-UT channels based on these measurements at the BS, and then performing MU-MIMO transmission from the BS to the UTs over the same band and within the channel coherence time.

Reducing the spatial reuse factor of the pilots reduces the number of pilots that need to be signaled within each training cycle. It thus reduces the pilot overhead and allows more slots to be used for data transmission. However, the need for reusing pilots spatially in all these training schemes comes at a cost in channel estimate quality. Consider estimating a channel between a BS and a UT in its cell by use of a given pilot (from a set of orthogonal pilots). UTs throughout the network using the same pilot interfere or "contaminate" the estimates between the BS and UT of interest. Typically, the closest the interfering UT is to the BS of interest, the largest the "pilot contamination" levels. As a result, although reducing the pilot spatial reuse factor increases the fraction of time dedicated to data transmission, it also increases the levels of pilot contamination and thus reduces the efficiency of the data transmission cycle.

An important issue in TDD-based training schemes is the fact that the pilot contamination caused by the reuse of a pilot in a neighboring cell strongly depends on which UT has been assigned the same pilot in the neighboring cells. Specifically, the quality of the estimate of the channel between a BS and a UT in its cell, obtained by a TDD-based training scheme, depends on the following quantities:

The large-scale power attenuation affecting transmissions from the UT to the BS, and the effective pilot transmit power; these dictate the power of the "useful pilot signal" component in the measured signal that is used for channel estimation at the BS of interest;

The large-scale power attenuation affecting transmissions from the UTs re-using the same pilot (in neighboring cells) to the BS of interest, and the associated transmit powers in these pilots; these dictate the power of the interference or pilot-contamination signal component in the measured signal that is used for channel estimation at the BS of interest.

The value of any such large-scale power attenuation quantity is affected by several factors, including distance between the transmitting and receiving parties, shadowing, and other environmental factors. Knowing these quantities would allow the BS to optimally use the measurements in forming its channel estimate so as to maximize the estimate quality.

Consider the basic setting whereby any given cell assigns its pilots randomly to its UTs within the cell, and independently of other cell pilot assignments. In such a setting, the pilot transmitted by any one of the UTs experiences pilot contamination whose power may take values over a possibly wide range, depending on the locations (and the transmit powers) of the UTs re-using this pilot in neighboring cells. The BS may not in general possess knowledge of the interference level experienced by each of the pilots used by its UTs. In that case, it would have to be conservative in forming its estimates (i.e., it would have to assume the highest possible level or a very high level among the possible interference levels). This can result in a significant reduction of the channel estimate quality.

As a result, there is evidently potential for improving the performance of TDD-based training schemes for DL MU-MIMO cellular and other multi-site deployments.

SUMMARY OF THE INVENTION

A method and apparatus is disclosed herein for employing pilot-reuse for training in the downlink of a wireless communication network. In one embodiment, the method comprises coordinating assignment of pilot codes across base stations in the topology and coordinating assignment of codes across base station-user terminal pairs, including assigning, from a set of pilot codes, a subset of codes to each cell in the topology, and assigning codes in each subset of codes to user terminals in said each cell based on cell dependent criteria; receiving waveforms from user terminals transmitting their assigned pilots; obtaining channel estimate information for channels between base station antennas and user terminals to which the base station is transmitting, the channel estimates based on the received waveforms; and transmitting to user terminals based on the channel estimate information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the invention focus on certain aspects of the training mechanism that can be used in cellular wireless networks in order to enable high spectral-efficiency transmission in the downlink of these networks. Embodiments of the invention are applicable to settings involving sets of transmit (collocated or non-collocated) antennas simultaneously transmitting to user terminals (UTs) in their coverage area. The methods disclosed herein are also applicable to the case, where within each transmission resource block (TRB), the base-station (BS) controller, controlling the joint transmission from the cluster of antennas, schedules a subset of UTs for transmission and generates multiple spatial streams that are superimposed and simultaneously transmitted using what is commonly referred to as multi-user multiple-input multiple-output (MU-MIMO) transmission methods.

More specifically, embodiments of the invention include methods for designing and operating pilot reuse patterns and parameters for TDD-based training schemes in the context of DL MU-MIMO. Embodiments of the invention include methods for coordinated reuse of pilots across a multi-site topology and techniques for assigning these pilots within each cell. Such coordinated reuse is performed in an effort to improve the overall system performance. Embodiments of the invention leverage the use of UT-specific information in assigning pilots in each cell. In addition, embodiments of the invention leverage the use of cell-dependent criteria in assigning pilots to UTs. These cell dependent criteria can be varied across the network in a static or semi-static manner to improve system performance.

Embodiments of the invention include a method for controlling the levels of pilot contamination across the network by coordinating the pilot assignment method and parameters across the network.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview of Wireless Communication System

Embodiments of the present invention are directed to a wireless multiple-input-multiple-output (MIMO) system. The MIMO system includes a number of cells covering a relatively large geographical area. Each of the cells includes a base station with multiple antennas and multiple mobiles. The base station serves the mobiles within the cell. The adjacent cell includes a base station having multiple antennas, which serves a plurality of mobiles within its cell.

As used herein, the term "mobile" may be considered synonymous to, and may hereafter be occasionally referred to, as a client, mobile unit, mobile station, mobile user, user equipment (UE), subscriber, user, remote station, access terminal, receiver, etc., and may describe a remote user of wireless resources in a wireless communication network. Also, as used herein, the term "base station" may be considered synonymous to, and may hereafter be occasionally referred to, as a Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

Example embodiments will be described with regard to a time division duplexing (TDD) orthogonal frequency division multiplexing (OFDM) scheme in which data transmissions in the uplink (from mobile to base station) and downlink (from base station to mobile) are time-shifted relative to one another. However, it will be understood that example embodiments may be implemented in other MIMO systems as well as other wireless communication systems and/or schemes. For example, methods discussed herein may be implemented in connection with a frequency division duplexing (FDD) or similar scheme.

As is well-known, a conventional OFDM scheme includes several frequency bins. In each frequency bin, data is transmitted independently from other bins. Example embodiments will be described with regard to data transmission in a single frequency bin. However, it will be understood that methods according to example embodiments may be applied in the same or substantially the same manner in all other bins.

Note that the methods described herein may be performed independently during each (time) coherence interval. As is well-known, in an OFDM communication scheme, a coherence interval is a time interval for which channel gain between a BS antenna and a given UT antenna (both at the same OFDM frequency slot) is assumed to remain constant. In the context of a TDD-based OFDM MU-MIMO communication scheme, any given coherence interval includes two phases: an uplink training interval and a data transmission interval.

Example Embodiments

Figure 1:
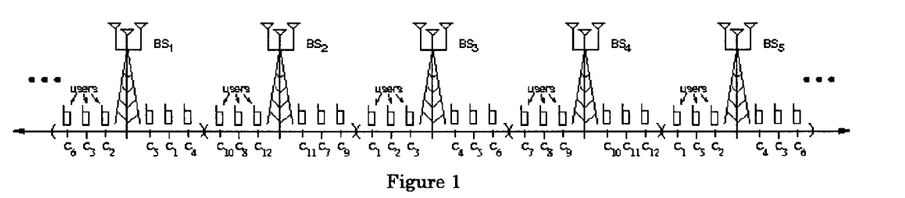
FIG. 1 illustrates a cell reuse-2 pilot pattern with independent UT-pilot assignment in each cell.

A sample set of embodiments covered by the invention as well as their potential benefits are illustrated in the context of the one-dimensional linear topology of BSs shown in FIG. 1. Within the cell associated with a given BS, there are a total of 6 UTs. From left to right, these UTs in a cell are referred to throughout as left-edge, left-middle, left-center, right-center, middle-center, and right-edge UT, respectively. A spacing $\Delta$ is assumed between any two consecutive BSs, and each cell extends over a segment $\pm\Delta/2$ around its BS. It is also assumed in the examples that, within each cell, center UTs, middle UTs, and edge UTs are at distances $\pm\delta$, $\pm\Delta/4$, and $\pm(\Delta/2-\delta)$ from their serving BS, and where $\delta$ is very small compared to $\Delta$. Thus, center UTs are effectively at the center of their cell, edge UTs are effectively right at the edge of their cell, while middle UTs are exactly at the mid point between the cell edge and the cell BS. To illustrate the benefits of some of the presented schemes, it is also assumed that the large-scale SNR (or receive signal power level) is path-loss based, i.e., the received power attenuates as a function of the distance between transmitter and receiver. In particular, it is assumed that the nominally received pilot power, i.e., the average received signal power at a BS associated with the unit-power pilot transmitted by a given UT depends only on the distance, d, between the BS and the UT. For values of d in the range [0, $\Delta/20$], it is assumed that the pathloss is constant, while for values of $d > \Delta/20$, it scales as $d^{-\alpha}$, where $\alpha \geq 2$ denotes the pathloss exponent (typical $\alpha$ values are in the range [3, 4]).

For illustrative purposes, the examples focus on the reuse of a set of orthogonal pilots across the 1D network. "Pilot-contamination" comparisons rely on what is referred to herein for convenience as pilot signal to pilot contamination interference ratio (S/$I_{pilot}$). This simplified measure attempts to capture the level of pilot contamination arising from all cells that reuse the same pilot. It is given by the following quantity $$S/I_{pilot}(UT, BS) = 10\log_{10} \frac{\text{rcv power at } BS \text{ of pilot xmted by } UT}{\underset{\text{all other UTs with same pilot}}{\text{maximum}} \text{rcv power at } BS \text{ of pilot xmted by } UT} \text{dB}$$

Although the S/$I_{pilot}$ metric is approximate, as it only includes the contribution of one of the many contaminating pilot transmissions (the one from the UT that uses the same pilot and is closest to the BS of interest), it serves as a convenient metric for capturing and explaining the benefits of some of the pilot assignment methods described herein.

The scenario in FIG. 1 corresponds to a reference setting, whereby a total of 12 orthogonal pilots are used by the UTs across the 1D topology for training. In this example, the ith pilot is depicted by the label $c_i$. The 12 pilots are split into two groups of 6 pilots each. The group $\{c_1, c_2, \ldots, c_6\}$ is provided to each odd-indexed BS, and the group $\{c_7, c_8, \ldots, c_{12}\}$ to the even BSs. The effective pilot cell-reuse equals 2, as each pilot is reused every 2 cells. In the example of FIG. 1, each BS has assigned its pilots independently of all other BSs. For example, $BS_3$ has assigned pilot $c_1$ to its left-edge UT. $BS_1$ and $BS_5$ have assigned the same pilot to their center-right and left-edge UTs, respectively. Similarly, $BS_3$ has assigned pilot $c_6$ to its right-edge UT. $BS_1$ and $BS_5$ have assigned the same pilot to their left-edge and right-edge UTs, respectively.

A challenge associated with independent assignment schemes, such as the one depicted in FIG. 1, is that the pilot-contamination level in the channel estimate between a BS and one of its UTs can take a wide range of values that are not a priori known at the BS. This "contamination-level" variation is due to the way the UT's pilot is reassigned in neighboring cells. For example, although the positions of the left-edge and right-edge users in cell $BS_3$ are symmetric, they experience different $S/I_{pilot}$ levels. For the left-edge UT, there is a $S/I_{pilot}$(left-edge UT in cell 3, $BS_3$)=10 $\log_{10}(3^\alpha)$ dB, while for the right-edge UT, there is a $S/I_{pilot}$(right-edge UT in cell 3, $BS_3$)=10 $\log_{10}(5^\alpha)$ dB. Assuming $\alpha$=3 these $S/I_{pilot}$ values become 14.3 dB and 21 dB respectively, for a gap of 6.7 dB.

As the example in FIG. 1 reveals, the quality of the pilot estimates significantly differs at the two edge users due to the fact that their pilots are reused independently in neighboring cells and thus the resulting pilot contamination level can span a large range of values. The resulting large variability in $S/I_{pilot}$ causes additional performance degradation since, in order to optimize the quality of the channel estimate at the BS, the BS needs to know accurately the interference level. In other words, given two settings with the same pilot interference levels, the more accurate the a priori knowledge of the interference level, the better the quality of the formed channel estimate.

The above example suggests the potential benefits of using pilot patterns in a coordinated fashion across the deployment, not just at the BS level (i.e., coordinating the assignment of codes across BSs) but also at the UT level (coordinating the assignments of codes across BS-UT pairs). FIGS. 2-6 represent embodiments of the invention.

Figure 2:
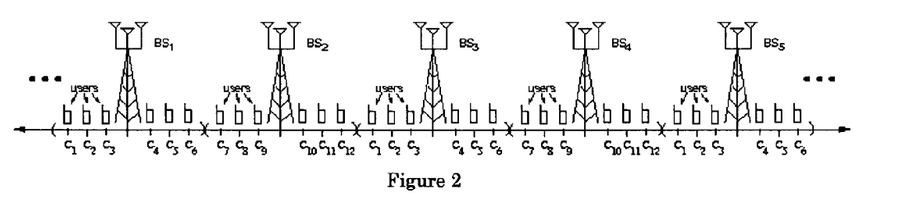
FIG. 2 illustrates a cell reuse-2 pilot pattern with uniform pilot assignment within each cell.

FIG. 2 shows the simplest instantiation of such a pilot pattern coordination for the scenario depicted in FIG. 1. Referring to FIG. 2, the sets of pilots used by each BS are the same as in FIG. 1. However, they are assigned in the same manner (from left to right) at each BS. In the given example, this guarantees a common $S/I_{pilot}$ for all edge UTs in each cell, a common $S/I_{pilot}$ for all middle UTs and a common $S/I_{pilot}$ for all center UTs. In a closer to "practical" setting where the locations of center/edge/middle UTs in each cell is varied, this method implies ordering the UTs on the left cell side in terms of their distance from their BS, from largest distance (smallest large-scale SNR) to smallest (largest SNR), then concatenating, to the end of this UT list, the UTs on the right cell side, ordered in terms of increasing distance (decreasing SNR) from their BS, and finally allocating codes sequentially through the resulting UT list. Such a scheme would yield distinct $S/I_{pilot}$ values to all edge (or middle, or center) UT, but with much smaller $S/I_{pilot}$ level variations than in the independent scheme of FIG. 1. Note that signal-to-interference-plus-noise ratio (SINR) values may be used instead of, or along with SNR values.

Figure 3:
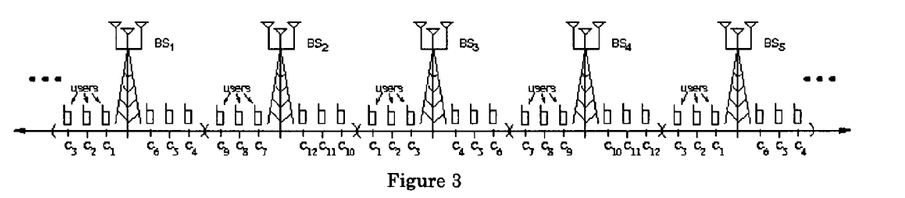
FIG. 3 illustrates a cell reuse-2 pilot pattern with left/right pilot reversal-coordination.

FIG. 3 shows another embodiment of the invention. The sets of pilots used by each BS are the same as in FIGS. 1 and 2. Unlike FIG. 2, however, when pilots are to be reused in a neighboring cell, they are not assigned in the same manner. Consider for example cell 3 (served by $BS_3$), which uses the same pilot assignment to its UTs in both FIGS. 2 and 3. These pilots are reused over cells 1 and 5 but they are assigned to UTs differently from cell 3. In particular, the pilots assigned to the left-side UTs in these cells are those assigned to the left-side UTs in these cell 3, but in reverse order (left-side pilot assignment reversal). The same applies to the pilots reused to the right. As a result in the example of FIG. 3, the pilots are reused every 2 cells, but the same pilot order is only reused every 4 cells, and any two consecutive odd (or even) numbered cells use pilot assignments that are left- and right-side reversals of each other.

The example in FIG. 3 yields improved $S/I_{pilot}$ levels to the edge-UTs at the expense in the $S/I_{pilot}$ levels of the center-UTs (the middle-UT $S/I_{pilot}$ levels remain unaffected in this example). Indeed assuming a value of $\alpha$=3 for the pathloss exponent, the configuration in FIG. 3 improves the edge-UT $S/I_{pilot}$ from 14.3 dB to 18.1 db (3.8 dB improvement) while it reduces the center-UT $S/I_{pilot}$ level from 48.1 dB to 44.3 dB (a 3.8 dB reduction in quality). This may be an attractive compromise, as the edge-user performance tends to dominate system design and performance in cellular and other multi-cite wireless architectures.

In the example of FIG. 3, one is guaranteed a common $S/I_{pilot}$ for all edge UTs in each cell, a common $S/I_{pilot}$ for all middle UTs and a common $S/I_{pilot}$ for all center UTs. In a closer to "practical" setting where the locations of center/edge/middle UTs in each cell is varied, this method would yield distinct $S/I_{pilot}$ levels for e.g., all UT locations, but with overall improved edge $S/I_{pilot}$ levels at the expense in center user $S/I_{pilot}$ levels. Note also that unlike the scheme in FIG. 2, different criteria are used in different cells for assigning pilots to UTs. In particular, the pilot assignment criteria in any given cell can be distinct from the pilot criteria in other neighboring cells using the same pilot set and can be statically (or adaptively) (re-) selected to optimize $S/I_{pilot}$ in neighboring cells.

Figure 4:
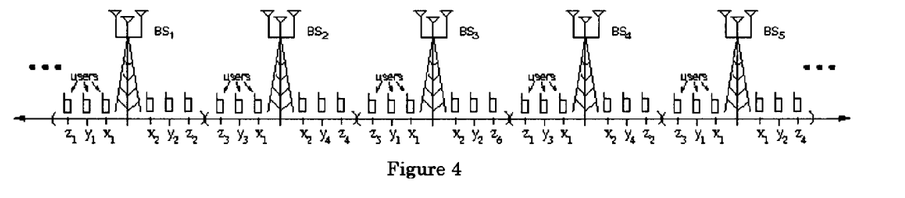
FIG. 4 illustrates a variable cell reuse-pilot pattern.
Figure 5:
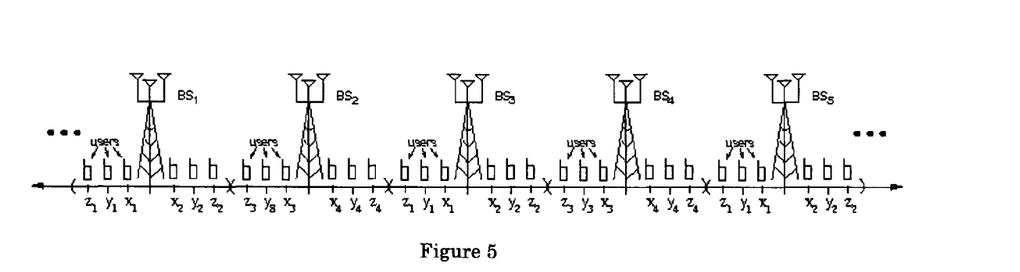
FIG. 5 illustrates a cell reuse-2 pilot pattern with uniform pilot assignment within each cell.

All examples in FIGS. 1-3 rely on the use of 12 pilots, and each pilot is reused every 2 cells. The examples in FIGS. 4 and 6 also use 12 pilots but the cell-reuse factor is pilot dependent. Referring to the example in FIG. 4, the 12 pilots have been relabeled for convenience to $\{x_1, x_2, y_1, y_2, y_3, y_4, z_1, z_2, \ldots, z_6\}$. In FIG. 4, the "x" pilots are used for center UTs, the "y" pilots are used for middle UTs, and the "z" pilots for edge UTs. All the center UT pilots are used in each cell (cell reuse 1), while the middle and edge UT pilots are reused every two and 3 cells respectively. [For convenience FIG. 5 shows again the example in FIG. 2, with an "x-y-z" relabeling of the pilots.] The example in FIG. 4 yields the same $S/I_{pilot}$ levels to middle-UTs as the examples in FIGS. 2 (5) and 3. The edge-UT $S/I_{pilot}$ levels are 21 dB (yielding 6.7 dB and 3.8 dB $S/I_{pilot}$ gains with respect to FIGS. 2/5 and 3 respectively), while the center UT $S/I_{pilot}$ levels are 39 dB (yielding 9 dB and 5.3 dB $S/I_{pilot}$ level degradation with respect to FIGS. 2/5 and 3 respectively). As a result, the variable-reuse pilot arrangement shown in FIG. 4 allows for a more aggressive $S/I_{pilot}$ trade-off between center and edge UTs. Finally, note that in the example of FIG. 4, each pilot set arrangement is reused every 6 cells.

Figure 6:
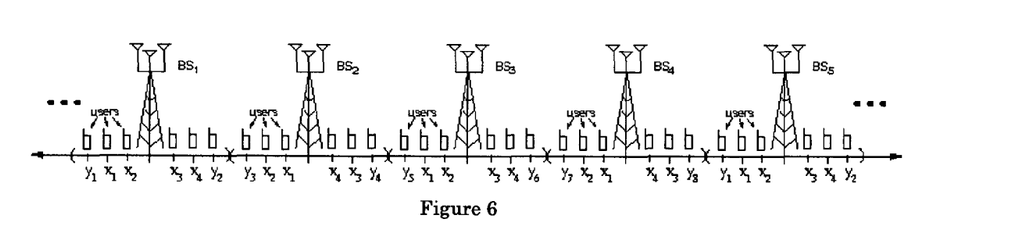
FIG. 6 illustrates a variable cell reuse-pilot pattern with left/right-side pilot reversal-coordination.

FIG. 6 shows an example whereby both the variable cell reuse and the left-side and right-side reversal assignment methods are combined. The 12 pilots have been relabeled for convenience to $\{x_1, x_2, x_3, x_4, y_1, y_2, \ldots, y_8\}$. The "x" pilots are assigned to both center and middle UTs, while the "y" pilots are assigned to edge UTs. All "x" pilots are reused in every cell (cell-reuse 1) with left/right-side reversal, while the edge UT pilots are re-used every $4^{th}$ cell. With respect to the assignments in FIGS. 3 and 4, the assignment in FIG. 6 represents an example of even more aggressive trade off, whereby the edge UT $S/I_{pilot}$ levels are further improved at the expense of both center and middle UT $S/I_{pilot}$ levels.

Many immediate extensions suggested by the examples in FIGS. 2-6 are of interest. First, the variable reuse methods may be combined with or without left/right side reversal in arbitrary ways. In general, each BS is given a collection of pilot sets (e.g., the "x" "y" and "z" sets in FIGS. 4-6 would correspond to such collections). Depending on their relative locations, relative SNRs, etc., the UTs are split into groups, and each group is assigned a pilot set. Then within each set (e.g. the "x" set), pilots are assigned to UTs taking again into account: the UTs' relative location (and/or received signal level) with respect to the BS; possibly the UTs' relative location (and/or received signal level) with respect to certain neighboring interfered BSs; and possibly the criteria based on which neighboring interfered BSs are performing their assignments of their own pilots.

Although the examples described herein consider uniform linear topologies and UT distributions, it should be evident that the techniques described herein can be readily applied to 2D topologies with uniform or non-uniform BS distributions, and uniform static or randomly changing UT cell distributions. In these cases, a mechanism for reusing several classes of pilots is used in which each BS controller is given a subset pilots in each class, as well as some coordination parameters. This, together with other information (such as UT relative location within the cell, large-scale SNR values to a subset of neighboring BSs, etc.), is used to assign to each UT in the cell (or cluster) the class from which the UT pilot is to be selected. Then, in conjunction with all the other UTs assigned to this pilot class, the pilots can be distributed to the UTs in the class. Additional parameters that are used for choosing the pilot to be used for each UT may include large-scale SNR between the UT and the BS, the distances between the UT and BSs in cells where the pilot is reused, the large-scale SNR values between the UT and BSs where the pilot is reused, the relative location of the UT in the topology, and comparisons to similar forms of information for other UTs in the cell.

Another embodiment involves a straightforward extension in which the transmit power-levels of the pilots are also varied in a cell-dependent manner. For example, by reducing the transmit power of the pilot labeled $c_1$ in cells 1, 5, 9, ... in FIG. 3, the pilot contamination levels experienced by edge UTs using pilot $c_1$ in cells 3, 7, 11, ... can be reduced.

In another embodiment, the method of reusing pilots by BS controllers across different cells may differ, not just in the order, but also in the form the pilot dimensions are separated into pilots. Such an example can be generated by modifying the example of FIG. 6, so that the even cells do not use pilots with labels $x_1$ and $x_2$ for their left middle and center UTs but rather pilots $z_1$ and $z_2$, whereby pilot $z_1$ is proportional to the sum of $x_1$ and $x_2$ while pilot $z_2$ is proportional to the difference of $x_1$ and $x_2$.

An Example of a Controller

In one embodiment, the pilot-pattern assignment is performed by a controller controlling a transmission from the antennas in a single or multiple cells. In one embodiment, for each of the UTs (selected or considered to be selected for training) in the cell, the following inputs are taken into consideration:

1. A subset of large scale UT-specific measurements/inputs which may include one or more of the following:
    each UT's relative location with respect to each of the TX antennas in the cell(s) controlled by the controller;
    each UT's average (large-scale) received power level to each of the TX antennas in the cell(s) controlled by the controller;
    the sector where the UT resides, in the case of sectorized deployments; and
    a (possibly coarse) estimate of the power level at which BS antennas in neighboring cells where the UT's pilot is reused would receive pilot transmissions from the given UT.
2. Information about the "criteria" for the pilot assignment method used in neighboring cells where any given pilot is reused. This information may be statically pushed to the BS controller or updated over relatively longer time scales. These criteria may include one or more of the following:
    the pilot-assignment criteria used in neighboring "pilot contaminating" cells;
    potential constraints on the interference requirements on specific pilots, or on the relative locations of the users employing those pilots; as an example, two sets of pilots, $\{c_1$ and $c_2\}$ and $\{c_3$ and $c_4\}$ may be assigned to UTs based on their large scale SNRs to two different neighboring BSs, i.e., $\{c_1$ and $c_2\}$ are assigned to two UTs with "acceptably" low large-scale received signal level to BS 1, while $\{c_3$ and $c_4\}$ are assigned to two UTs with "acceptably" low large-scale received signal level to BS 2. Furthermore, UTs with lower (higher) large-scale received signal level to BS 1 are assigned to $c_1$ ($c_2$). Furthermore, what is "acceptably low" large-scale received signal level may be varied systematically from resource block to resource block to allow accommodating/scheduling all users.
    pilot power levels used by pilot-contaminating UTs in neighboring cells.

Based on the above information, the BS controller assigns pilots (and potentially pilot power levels) to its UTs. Specifically, the BS controller first sets its own pilot assignment criteria based on the information available from item 2 above. Then according to the criteria and the large-scale UT measurement inputs, the BS decides on an assignment of pilots to its set of UTs.

In another embodiment, another entity selects some or all the pilot assignment criteria used by the BS controller to assign its pilots. According to the embodiment, this entity may collect information from neighboring cells that are reusing pilots and possibly some aggregate statistics about UT information in these cells. Then the entity may decide on the pilot assignment criteria to be used (on subsets of pilots used) by (subsets of) the BS controllers controlling these cells, and then push these pilot-assignment criteria to the BS controllers of interest.

Figure 7:
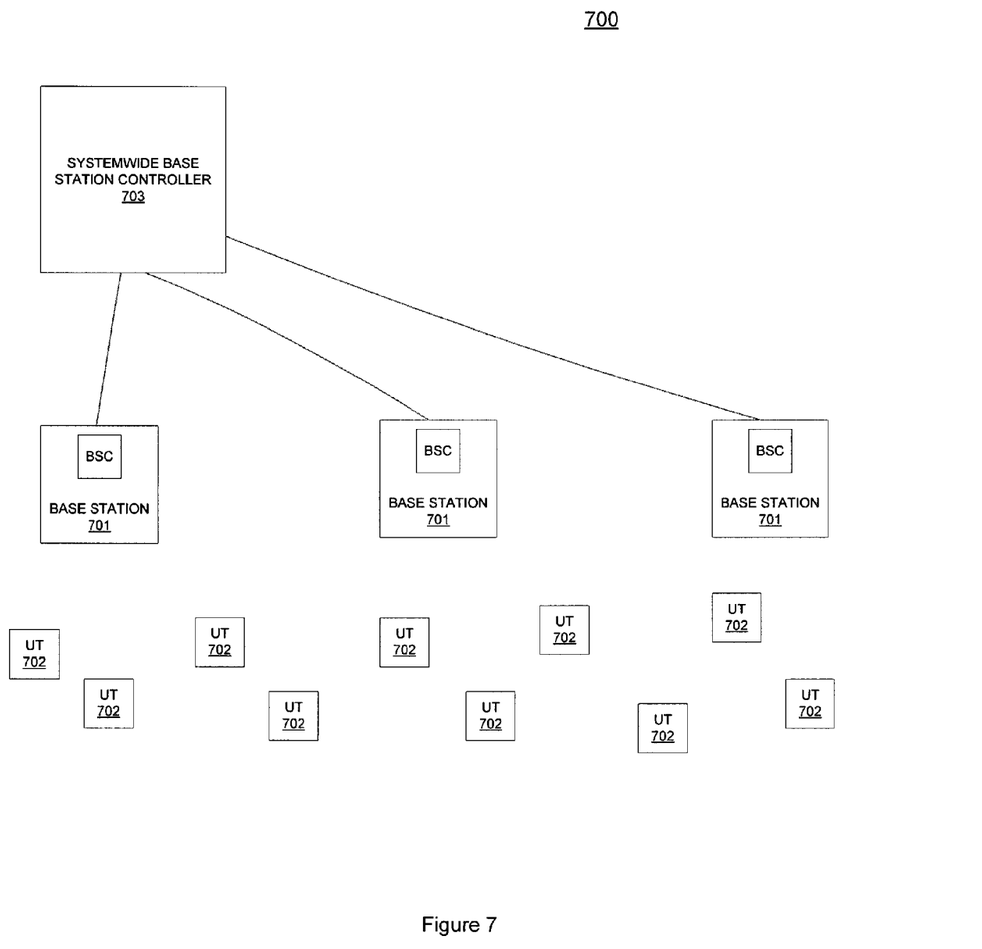
FIG. 7 illustrates a block diagram of one embodiment of a wireless communications system.

FIG. 7 is a block diagram of one embodiment of a wireless communication system. Referring to FIG. 7, the communication system comprises multiple base stations 701 located cells in a topology, multiple user terminals 702, and a base station controller 703 to control joint transmission from a set of transmit antennas and control coordinated reuse of pilots across the topology.

Base station controller 703 controls the joint transmission by coordinating assignment of pilot codes across base stations in the topology and coordinating assignment of codes across base station-user terminal pairs. In one embodiment, this is performed by assigning, from a set of pilot codes, a subset of codes to each cell in the topology, and assigning codes in each subset of codes to user terminals in said each cell based on cell dependent criteria.

Each of base stations 701 is operable to receive waveforms from a set of user terminals to which said each base station is to transmit signals, the waveforms corresponding to pilot codes assigned the set of user terminals, obtain channel estimate information for channels between base station antennas of said each base station and the set of user terminals, the channel estimates being based on the received waveforms, and transmit to the set of user terminals based on the channel estimate information.

In one embodiment, after receiving the waveform (training sequences) transmitted from all mobiles, the base station estimates channel coefficient matrices between the mobiles transmitting the waveforms and the antennas at the base station. The base station generates each of the estimated channel matrices based on the received signal vectors, and estimates of the signal and interference powers in a manner well-known in the art. In one embodiment, the base station generates the estimated channel matrices using a standard minimum mean square error (MMSE) estimator in a manner well-known in the art. Then, during the data transmission interval, the base station computes a precoder/a precoding matrix based on the estimated channel coefficient matrices.

In one embodiment, the assignments of pilots are related to the scheduling of UTs. More specifically, a group of user terminals scheduled for joint transmission in neighboring cells (or neighboring clusters of BSs, whereby all BSs in a cluster are engaged in joint MU-MIMO transmission) are assigned pilots in a coordinated way across cells, so that pilot reassignments in these neighboring cells are done systematically to obtain good performance levels. For example, controller 703 may be controlling assignments in a large set of cells and can be pushing periodically the updated criteria for pilot assignments to its BSs. For instance, controller 703 can take into account "aggregate" statistics/distributions of large-scale SINRs from UTs to neighboring BSs, provided periodically by each cell (each BS) that controller 703 controls (these would change slowly over time during the day), and use this to update the criteria that controller 703 pushes to each cell for assigning pilots. This could correspond to e.g., threshold type large-scale received power-level criteria, i.e., "don't schedule" (or, "only schedule") on this pilot users with large-scale received signal strength to this BS that is greater (or less) than a threshold, ordering type criteria (e.g., assign given pilot set to UTs in order of increasing or decreasing signal level to a given BS), or combinations thereof. Controller 703 could also even change the number of pilots that are available to a cell (e.g., when a neighboring cell becomes very busy with traffic). Hence, controller 703 indicates the pilots that are assigned to the cell and rules by which user terminals can be assigned to use those assigned pilots.

Now once these cell-specific criteria are pushed to the cells, the base station in each cell would use its criteria for pilot assignments, pilot-power level selections, and even possibly for UT scheduling.

Thus, in one embodiment of the system, the controller 703 decides and pushes the (cell-specific) criteria to each cell periodically. This defines for each cell a set of scheduling classes (and mappings of resource blocks to these classes), groups of pilots in each class, and criteria for assigning pilots in each group to users. The actual pilot assignment would then be done autonomously by each BS based on its own cell-specific instructions. The BS may also exploit information provided by neighboring BSs reusing one or more of its pilots (e.g., large-scale received signal strength of one or more of its UTs at the neighboring BS).

Figure 8:
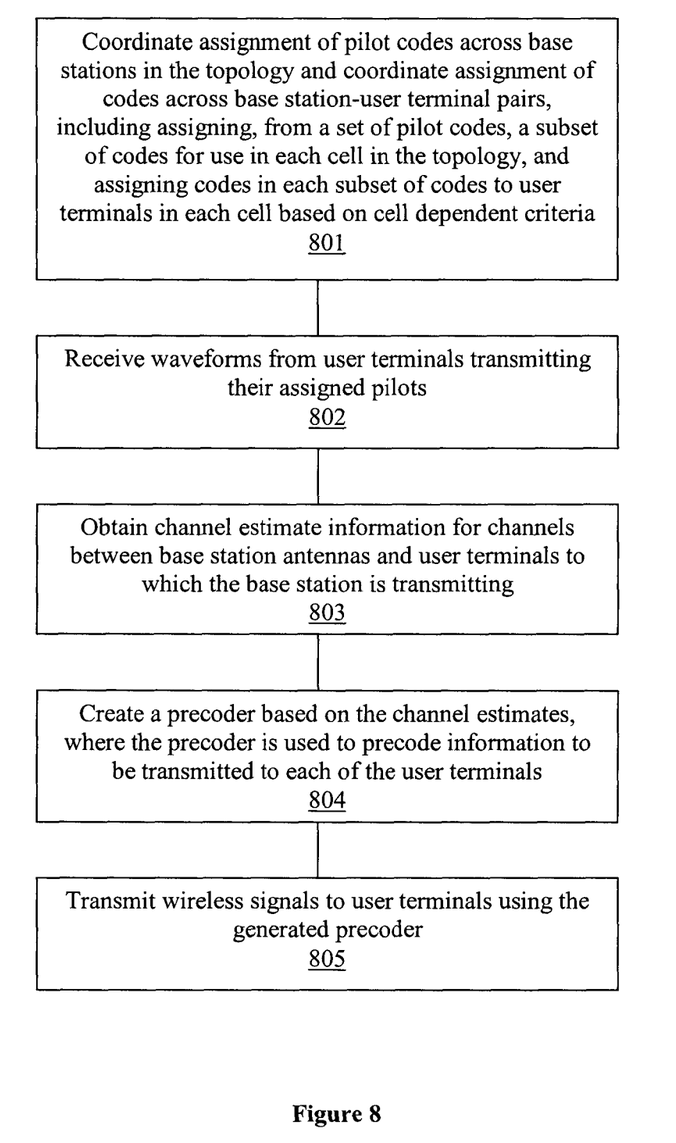
FIG. 8 is a flow diagram of one embodiment of a process for training the downlink in a wireless communication network.

FIG. 8 is a flow diagram of one embodiment of a process for training the downlink in a wireless communication network having a topology of cells using a coordinated reuse of pilots across the topology, where each cell contains a base station. The process is performed by processing logic that may comprise hardware (e.g., circuitry, dedicated logic, etc.), software (such as is run on a general purpose computer system or a dedicated machine), or a combination of both. In one embodiment, this processing logic is part of base station controllers.

Referring to FIG. 8, the process begins by processing logic coordinating assignment of pilot codes across base stations in the topology and coordinating assignment of codes across base station-user terminal pairs, including assigning, from a set of pilot codes, a subset of codes for use in each cell in the topology, and assigning codes in each subset of codes to user terminals in said each cell based on cell dependent criteria (processing block 801). In one embodiment, a controller in the wireless network assigns the subset of codes that can be used in each cell and notifies the cell of the subset of codes. In one embodiment, the UT in a cell is notified as to which pilot to transmit on for training its channels by the cell's BS signaling to the UT a pilot identifier along with an identifier of a transmit power level to be used via a control channel from the BS. In another embodiment, the transmit power level is not signaled.

In one embodiment, the criteria is signal-to-noise ratio (SNR)-based criteria. In one embodiment, the criteria is location-based criteria. In one embodiment, assigning the subset of codes to each cell is based on user terminal-specific information. In one embodiment, a pilot code is assigned to a first user terminal based on the first user terminal's signal level with respect to the base station transmitting to it. In one embodiment, a pilot code is assigned to a first user terminal based on the first user terminal's relative location with respect to the base station transmitting to it. In one embodiment, a pilot code is assigned to a first user terminal based on the first user terminal's signal level with respect to one or more neighboring base stations that would be interfered with by the first user terminal transmitting the pilot code. In one embodiment, a pilot code is assigned to a first user terminal based on the first user terminal's relative location with respect to one or more neighboring base stations that would be interfered with by the first user terminal transmitting the pilot code.

In one embodiment, one pilot code is assigned to a first user terminal based on which neighboring base stations, which would be interfered with by the first user terminal transmitting the pilot code, are performing their assignments of the one pilot code. In one embodiment, assigning codes in each subset of codes to user terminals in each cell based on cell dependent criteria comprises assigning codes in a first subset of codes to a first set of user terminals in a first cell based on first cell dependent criteria and assigning codes in a second subset of codes to a second set of user terminals in a second cell based on second cell dependent criteria, where the first and second cell dependent criteria being different.

Subsequently, processing logic receives waveforms from user terminals transmitting their assigned pilots (processing block 802). This may be performed by base stations using receive antennas in their front ends to receive the waveforms.

Using the received waveforms, processing logic obtains channel estimate information for channels between base station antennas and user terminals to which the base station is transmitting (processing block 803). This is performed using control logic (e.g., a processor) in the base station in a manner well-known in the art.

Then, processing logic creates a precoder based on the channel estimates, where the precoder is used to precode information to be transmitted to each of the user terminals (processing block 804). This is performed in a manner well-known in the art and is not described herein to avoid obscuring the present invention.

Using the precoder, processing logic transmits wireless signals to user terminals using the generated precoder (processing block 805). In one embodiment, these transmissions are performed using the base station transmitters in the base station front-ends.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for training in the downlink of a wireless communication network having a topology of cells using a coordinated reuse of pilots codes across the topology, each cell containing a base station, the method performed by each base station comprising:
   receiving, at the base station having at least a processor and a memory therein, an assignment of a subset of codes from a set of pilot codes;
   assigning codes in each subset of codes to user terminals in said each cell based on cell dependent criteria, the pilot codes being reused across the topology of cells by using the cell-dependent criteria in assigning the pilot codes to the user terminals within each cell;
   receiving waveforms from user terminals transmitting their assigned pilots;
   obtaining channel estimate information for channels between base station antennas and user terminals to which the base station is transmitting, the channel estimates based on the received waveforms; and
   transmitting precoded information to user terminals based on the channel estimate information.

2. The method defined in claim 1 wherein the criteria include one or more of signal-to-noise ratio (SNR)-based criteria and signal-to-interference-plus-noise ratio (SINR)-based criteria.

3. The method defined in claim 1 wherein the criteria include relative location-based criteria.

4. The method defined in claim 1 wherein the assignment of the subset of codes is based on user terminal-specific information.

5. The method defined in claim 1 wherein a pilot code is assigned to a first user terminal based on the first user terminal's signal level with respect to the base station transmitting to the first user terminal.

6. The method defined in claim 1 wherein a pilot code is assigned to a first user terminal based on the first user terminal's relative location with respect to the base station transmitting to the first user terminal.

7. The method defined in claim 1 wherein a pilot code is assigned to a first user terminal based on the first user terminal's signal level with respect to one or more neighboring base stations that would be interfered with by the first user terminal transmitting the pilot code.

8. The method defined in claim 1 wherein a pilot code is assigned to a first user terminal based on the first user terminal's relative location with respect to one or more neighboring base stations that would be interfered with by the first user terminal transmitting the pilot code.

9. The method defined in claim 1 wherein one pilot code is assigned to a first user terminal based on which neighboring base stations, which would be interfered with by the first user terminal transmitting the pilot code, are performing their assignments of the one pilot code.

10. The method defined in claim 1 wherein assigning codes in each subset of codes to user terminals in said each cell based on cell dependent criteria comprises assigning codes in a first subset of codes to a first set of user terminals in a first cell based on first cell dependent criteria and assigning codes in a second subset of codes to a second set of user terminals in a second cell based on second cell dependent criteria, the first and second cell dependent criteria being different.

11. The method defined in claim 1 further comprising creating a precoder based on the channel estimates, the precoder to precode information to be transmitted to each of the user terminals.

12. A wireless communication system comprising:
    a plurality of base stations located in cells in a topology, each of the plurality of base stations having at least a processor and a memory therein;
    a plurality of user terminals;
    a base station controller to control joint transmission from a set of transmit antennas and control coordinated reuse of pilots codes across the topology, by coordinating assignment of pilot codes across base stations in the topology;
    coordinating assignment of codes across base station-user terminal pairs, including assigning, from a set of pilot codes, a subset of codes to each cell in the topology;
    wherein each base station is operable to:
       (i) assign codes in each subset of codes to user terminals in each cell based on cell dependent criteria, the pilot codes being reused across the topology of cells by using the cell-dependent criteria in assigning the pilot codes to the user terminals within each cell;
       (ii) receive waveforms from a set of user terminals to which said each base station is to transmit signals, the waveforms corresponding to pilot codes assigned the set of user terminals;
       (iii) obtain channel estimate information for channels between base station antennas of said each base station and the set of user terminals, the channel estimates being based on the received waveforms; and
       (iv) transmit precoded information to the set of user terminals based on the channel estimate information.

13. The system defined in claim 12 wherein the criteria comprises one or more of signal-to-noise ratio (SNR)-based criteria and signal-to-interference-plus-noise ratio (SINR) based criteria.

14. The system defined in claim 12 wherein the criteria is location-based criteria.

15. The system defined in claim 12 wherein assigning the subset of codes to each cell is based on user terminal-specific information.

16. The system defined in claim 12 wherein a pilot code is assigned to a first user terminal based on the first user terminal's signal level with respect to the base station transmitting to the first user terminal or based on the first user terminal's relative location with respect to the base station transmitting to the first user terminal.

17. The system defined in claim 12 wherein a pilot code is assigned to a first user terminal based on the first user terminal's signal level with respect to one or more neighboring base stations that would be interfered with by the first user terminal transmitting the pilot code or based on the first user terminal's relative location with respect to one or more neighboring base stations that would be interfered with by the first user terminal transmitting the pilot code.

18. The system defined in claim 12 wherein one pilot code is assigned to a first user terminal based on which neighboring base stations are performing their assignments of the one pilot code, wherein the first user terminal infers which neighboring base stations are performing their assignments of the one pilot code by the first user terminal transmitting the pilot code.

19. The system defined in claim 12 wherein the base station controller assigns codes in each subset of codes to user terminals in each cell based on cell dependent criteria by assigning codes in a first subset of codes to a first set of user terminals in a first cell based on first cell dependent criteria and assigning codes in a second subset of codes to a second set of user terminals in a second cell based on second cell dependent criteria, the first and second cell dependent criteria being different.

* * * * *